(12) United States Patent
Schmieder et al.

(10) Patent No.: US 9,137,338 B2
(45) Date of Patent: Sep. 15, 2015

(54) MULTI-LINK REMOTE PROTOCOL

(75) Inventors: Wilhelm R. Schmieder, Snoqualmie, WA (US); Nelamangal Krishnaswamy Srinivas, Sammamish, WA (US); Vladimir K. Stoyanov, Redmond, WA (US); Nadim Y. Abdo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 548 days.

(21) Appl. No.: 12/692,547

(22) Filed: Jan. 22, 2010

(65) Prior Publication Data

US 2011/0185068 A1    Jul. 28, 2011

(51) Int. Cl.
   *G06F 15/16*    (2006.01)
   *G06F 15/173*    (2006.01)
   *H04L 29/06*    (2006.01)
   *H04W 80/06*    (2009.01)

(52) U.S. Cl.
   CPC ............... *H04L 69/16* (2013.01); *H04L 69/14* (2013.01); *H04L 69/24* (2013.01); *H04W 80/06* (2013.01)

(58) Field of Classification Search
   CPC ...... H04L 67/14; H04L 69/16; H04L 67/1002
   See application file for complete search history.

(56) References Cited

U.S. PATENT DOCUMENTS

| | | | |
|---|---|---|---|
| 6,061,714 A | | 5/2000 | Housel, III et al. |
| 6,708,218 B1 * | | 3/2004 | Ellington et al. ............ 709/236 |
| 6,989,836 B2 | | 1/2006 | Ramsey |
| 7,051,358 B2 | | 5/2006 | Hakenberg et al. |
| 7,185,069 B2 | | 2/2007 | Costin et al. |
| 7,274,368 B1 | | 9/2007 | Keslin |
| 7,327,676 B2 | | 2/2008 | Teruhi et al. |
| 7,346,652 B2 | | 3/2008 | Berrigan et al. |
| 7,441,267 B1 | | 10/2008 | Elliott |
| 7,460,725 B2 | | 12/2008 | Malladi et al. |
| 7,548,547 B2 | | 6/2009 | Patwardhan et al. |
| 7,587,520 B1 | | 9/2009 | Kent et al. |
| 7,720,906 B2 | | 5/2010 | Brockway et al. |
| 8,463,918 B2 | | 6/2013 | Schmieder et al. |
| 2006/0142878 A1 | | 6/2006 | Banik et al. |

(Continued)

FOREIGN PATENT DOCUMENTS

| | | |
|---|---|---|
| CN | 1758286 A | 4/2006 |
| CN | 1996919 A | 7/2007 |

(Continued)

OTHER PUBLICATIONS

Microsoft, "Remote Desktop Services Virtual Channels," published May 15, 2008, 1 page, downloaded at http://msdn.microsoft.com/en-us/library/aa383509%28VS.85%29.aspx.

(Continued)

*Primary Examiner* — Peling Shaw
(74) *Attorney, Agent, or Firm* — Merchant & Gould P.C.

(57) ABSTRACT

In various embodiments, a remote client is allowed to access at least a part of a connection service located on alternate sources other than the primary remote presentation server. In some embodiments, the remote presentation virtual channels may be split into multiple connections with the purpose of allowing better flow control. Some embodiments may be implemented in a virtual machine environment for cases in which the data to be transferred through a data channel is located in the host virtual machine partition but the remote endpoint is located on the guest virtual machine partition.

20 Claims, 17 Drawing Sheets

(56) References Cited

U.S. PATENT DOCUMENTS

| | | | |
|---|---|---|---|
| 2006/0179118 A1 | 8/2006 | Stirbu | |
| 2007/0174410 A1 | 7/2007 | Croft et al. | |
| 2007/0237077 A1* | 10/2007 | Patwardhan et al. | 370/230 |
| 2008/0112398 A1 | 5/2008 | McClung et al. | |
| 2008/0301566 A1 | 12/2008 | Abdo et al. | |
| 2008/0313545 A1 | 12/2008 | Patel et al. | |
| 2008/0313549 A1* | 12/2008 | Stoyanov et al. | 715/749 |
| 2009/0027495 A1* | 1/2009 | Oskin et al. | 348/143 |
| 2009/0106662 A1* | 4/2009 | Ye et al. | 715/740 |
| 2009/0183085 A1 | 7/2009 | Pasetto et al. | |
| 2010/0070870 A1 | 3/2010 | Halperin et al. | |
| 2010/0268828 A1 | 10/2010 | Pahlavan et al. | |
| 2012/0159354 A1 | 6/2012 | Van Wie et al. | |
| 2013/0268685 A1 | 10/2013 | Schmieder et al. | |

FOREIGN PATENT DOCUMENTS

| | | |
|---|---|---|
| EP | 1 094 646 | 4/2001 |
| WO | WO 2009052370 | 4/2009 |

OTHER PUBLICATIONS

"MSRDP (Microsoft Remote Desktop Protocol)," published Nov. 29, 2009, 9 pages, downloaded at http://www.protocolbase.net/protocols/protocol_MSRDP.php.

"Remote Desktop Services (Terminal Services) Team Blog," retrieved Nov. 20, 2009, 5 pages, downloaded at http://blogs.msdn.com/rds/archive/2007/09/20/dynamic-virtual-channels.aspx.

Chinese 1st Office Action in Application 201110029879.9, mailed Aug. 29, 2014, 16 pgs.

Chinese 1st Office Action in Application 201110031217.5, mailed Oct. 9, 2014, 11 pgs.

Sinha, R. et al., "An Adaptive Multiple Retransmission Technique for Continuous Media Streams," Dec. 18, 2008, 6 pages, downloaded at: www.cs.colostate.edu/~christos/papers/nossdav04.pdf.

U.S. Appl. No. 12/691,979, Amendment and Response filed Jan. 10, 2012, 10 pgs.

U.S. Appl. No. 12/691,979, Amendment and Response filed Jun. 28, 2012, 10 pgs.

U.S. Appl. No. 12/691,979, Notice of Allowance mailed Feb. 15, 2013, 7 pgs.

U.S. Appl. No. 12/691,979, Office Action mailed Oct. 11, 2011, 16 pgs.

U.S. Appl. No. 12/691,979, Office Action mailed Apr. 2, 2012, 15 pgs.

U.S. Appl. No. 13/906,962, Office Action mailed Nov. 7, 2014, 14 pgs.

U.S. Appl. No. 13/906,962, Amendment and Response filed Feb. 2, 2015, 11 pgs.

Second Office Action Issued in Chinese Patent Application No. 201110031217.2, Mailed Date: May 25, 2015, 6 Pages.

U.S. Appl. No. 13/906,962, Office Action mailed Jun. 4, 2015, 6 Pages.

U.S. Appl. No. 13/906,962, Amendment and Response After Final Office Action filed Jul. 31, 2015, 3 Pages.

Second Office Action Received for Chinese Patent Application No. 201110029879.9, Mailed Date: May 4, 2015, 6 Pages.

* cited by examiner

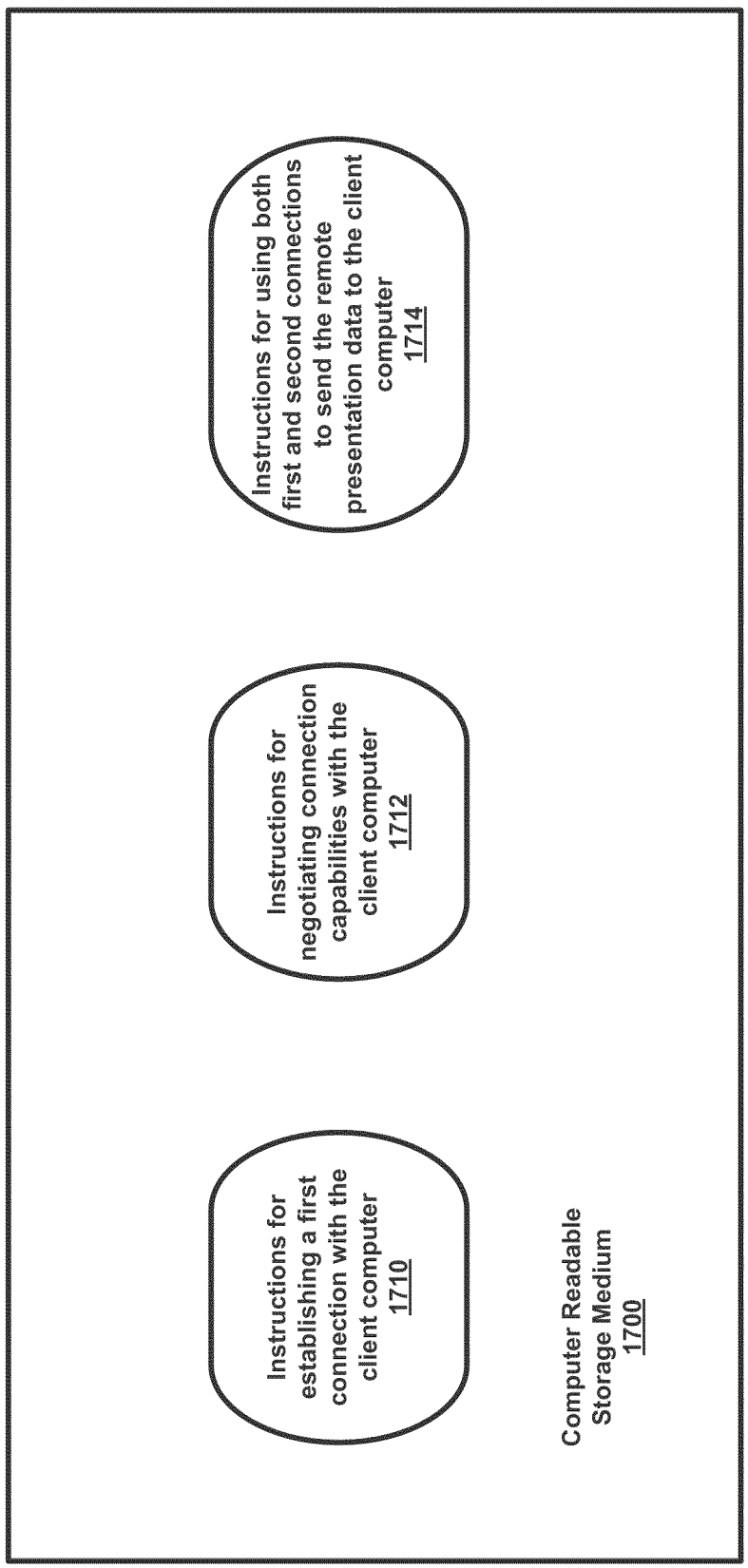

MULTI-LINK REMOTE PROTOCOL

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource.

In remote desktop scenarios the graphics content of a user's desktop located on a host computer (e.g., the server) is typically streamed to another computer (e.g., the client). The server and the client will exchange the desktop graphics data in a well defined protocol or format. In some cases the graphics data may be generated on a host virtual machine and when the client end point is on a guest virtual machine partition, the guest virtual machine may have to communicate through a communication channel such as a virtual bus to receive the graphics data from the host, which in turn is transmitted to the client. Such a setup can introduce latencies that can affect the remote client's user experience. Thus, other techniques are needed in the art to solve the above described problems.

SUMMARY

In various embodiments, methods and systems are disclosed that allow the client to receive data directly from the host and thus eliminate a portion of the latency.

In some embodiments, a remote client is allowed to access at least a part of a connection service located on alternate sources other than the primary remote presentation server. In some embodiments, the remote presentation virtual channels may be split into multiple connections with the purpose of allowing better flow control. Some embodiments may be implemented in a virtual machine environment for cases in which the data to be transferred through a data channel is located in the host virtual machine partition but the remote endpoint is located on the guest virtual machine partition.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for altering a view perspective within a virtual environment in accordance with this specification are further described with reference to the accompanying drawings in which:

FIG. 17 illustrates a computer readable medium bearing computer executable instructions discussed with respect to FIGS. 1-16.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

Figure 1:
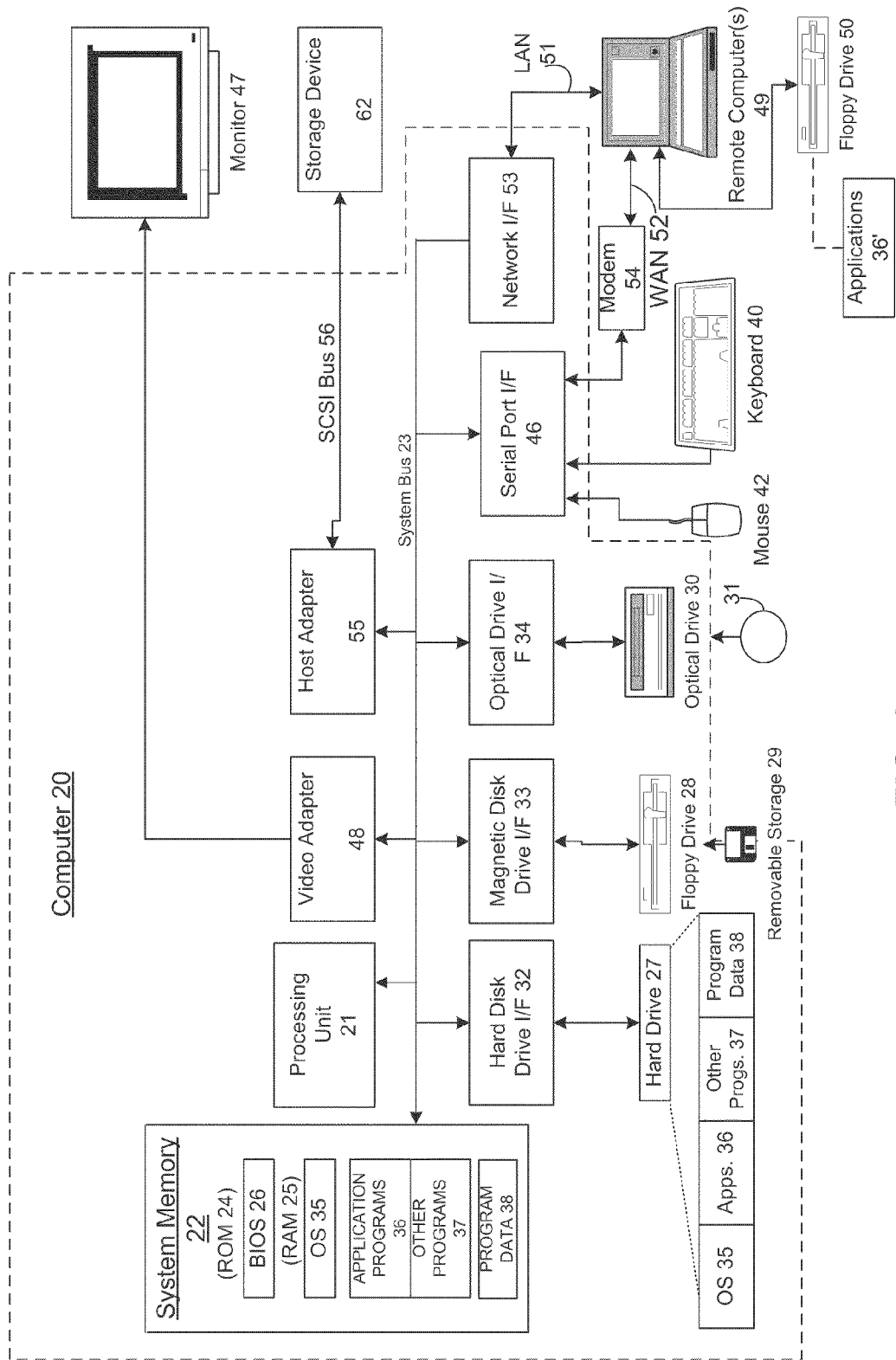
FIGS. 1 and 2 depict an example computer system wherein aspects of the present disclosure can be implemented.
Figure 2:
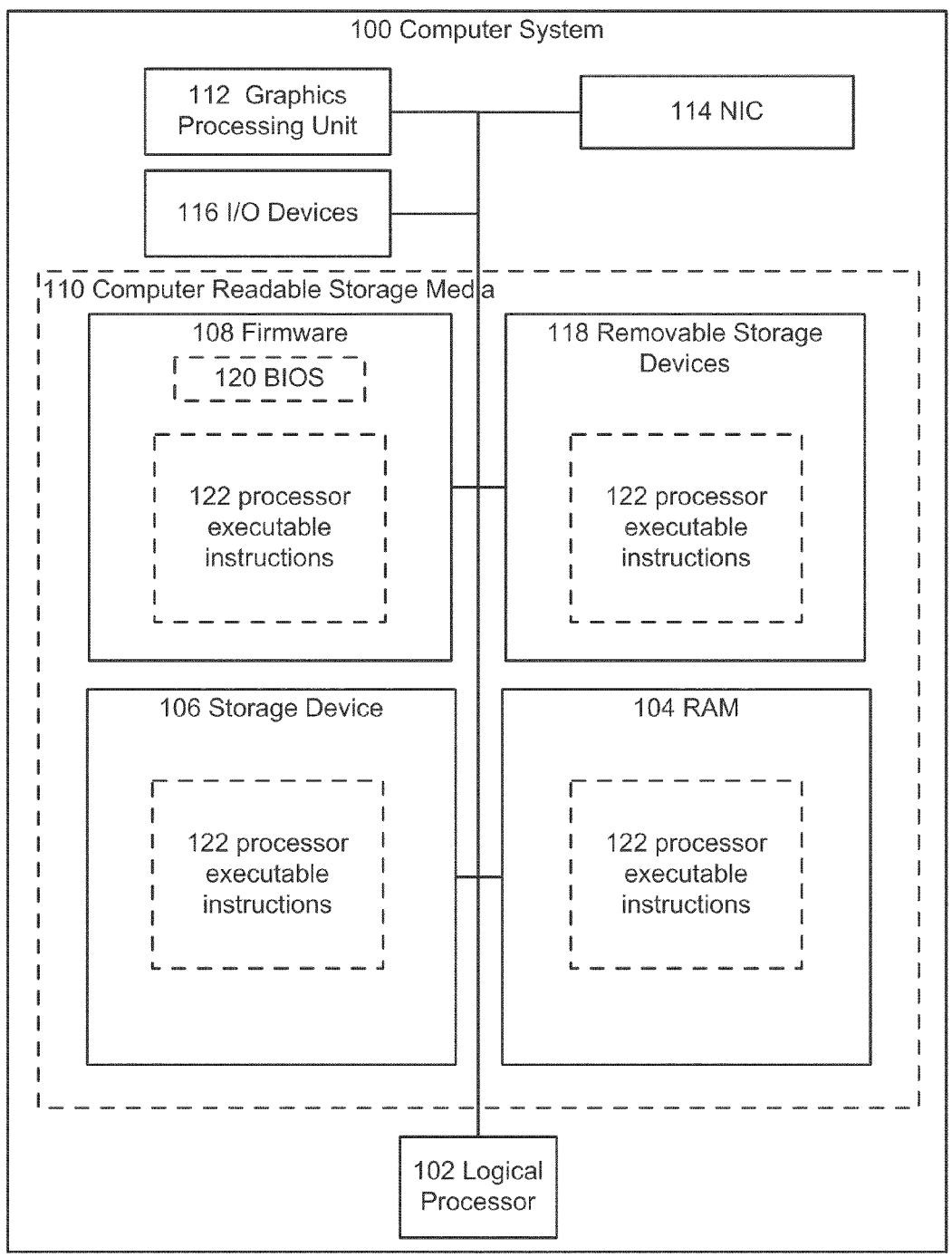

Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/ software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media provide non-volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely accessed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
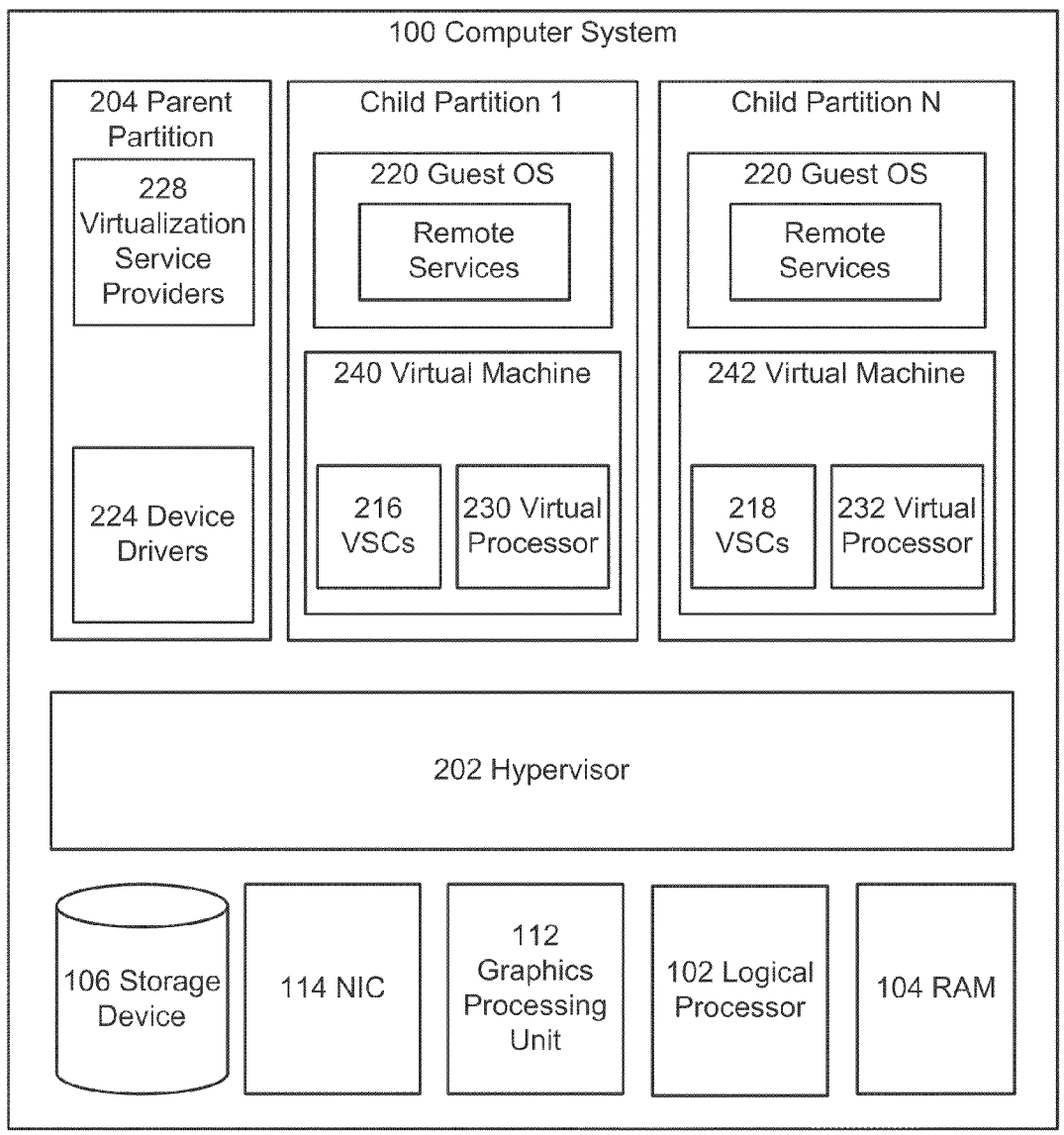
FIG. 3 depicts an operational environment for practicing aspects of the present disclosure.
Figure 4:
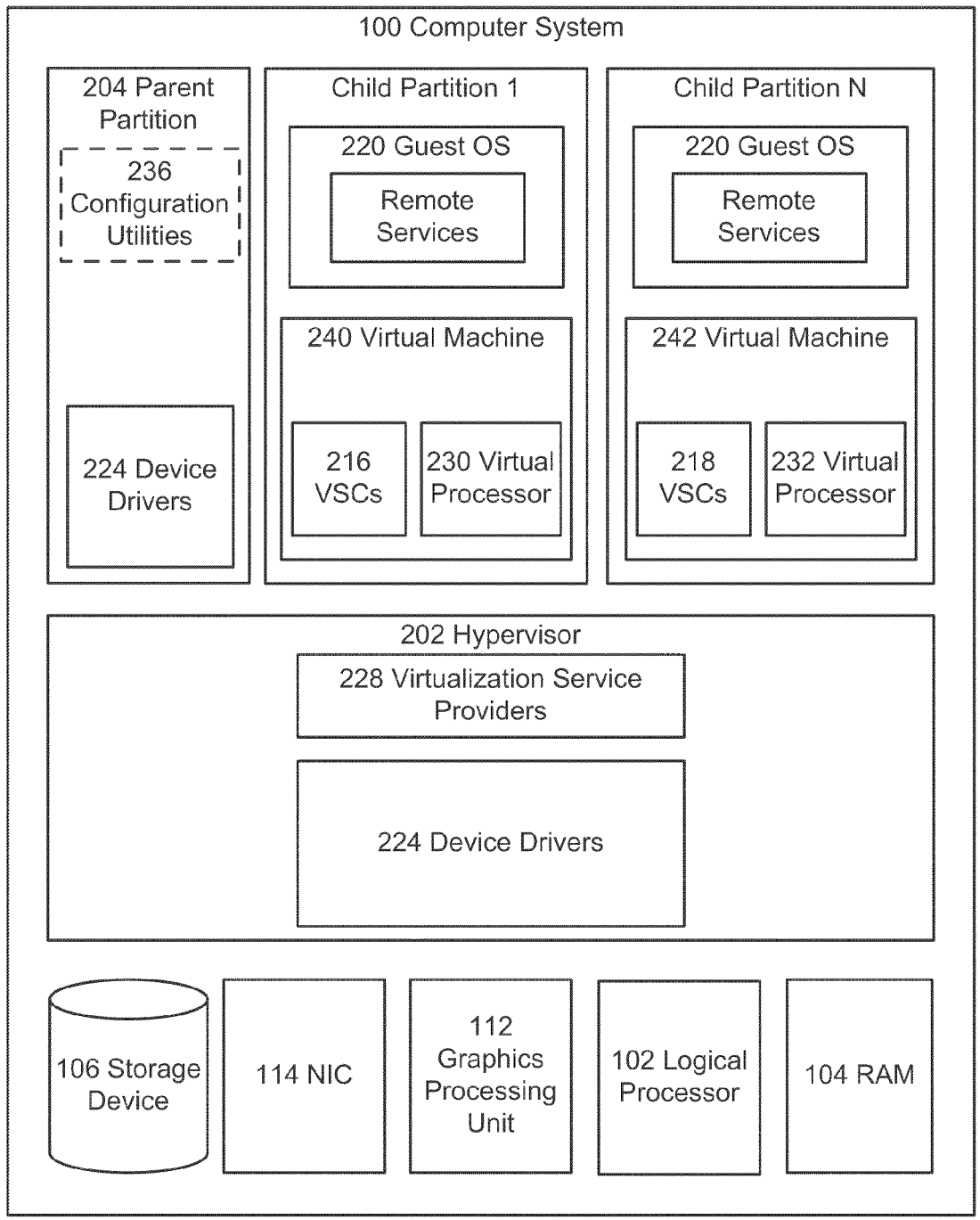
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
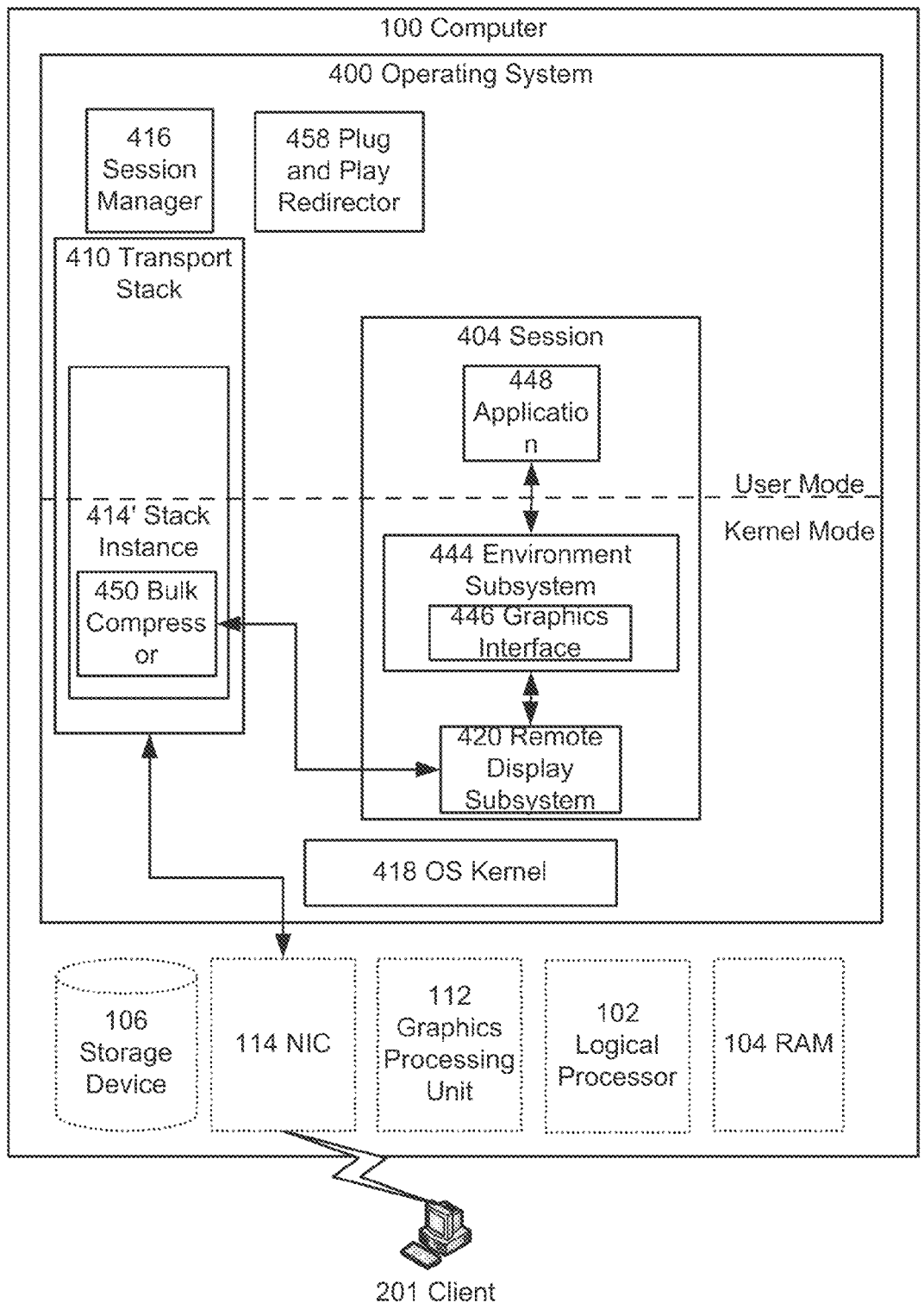
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

Figure 6:
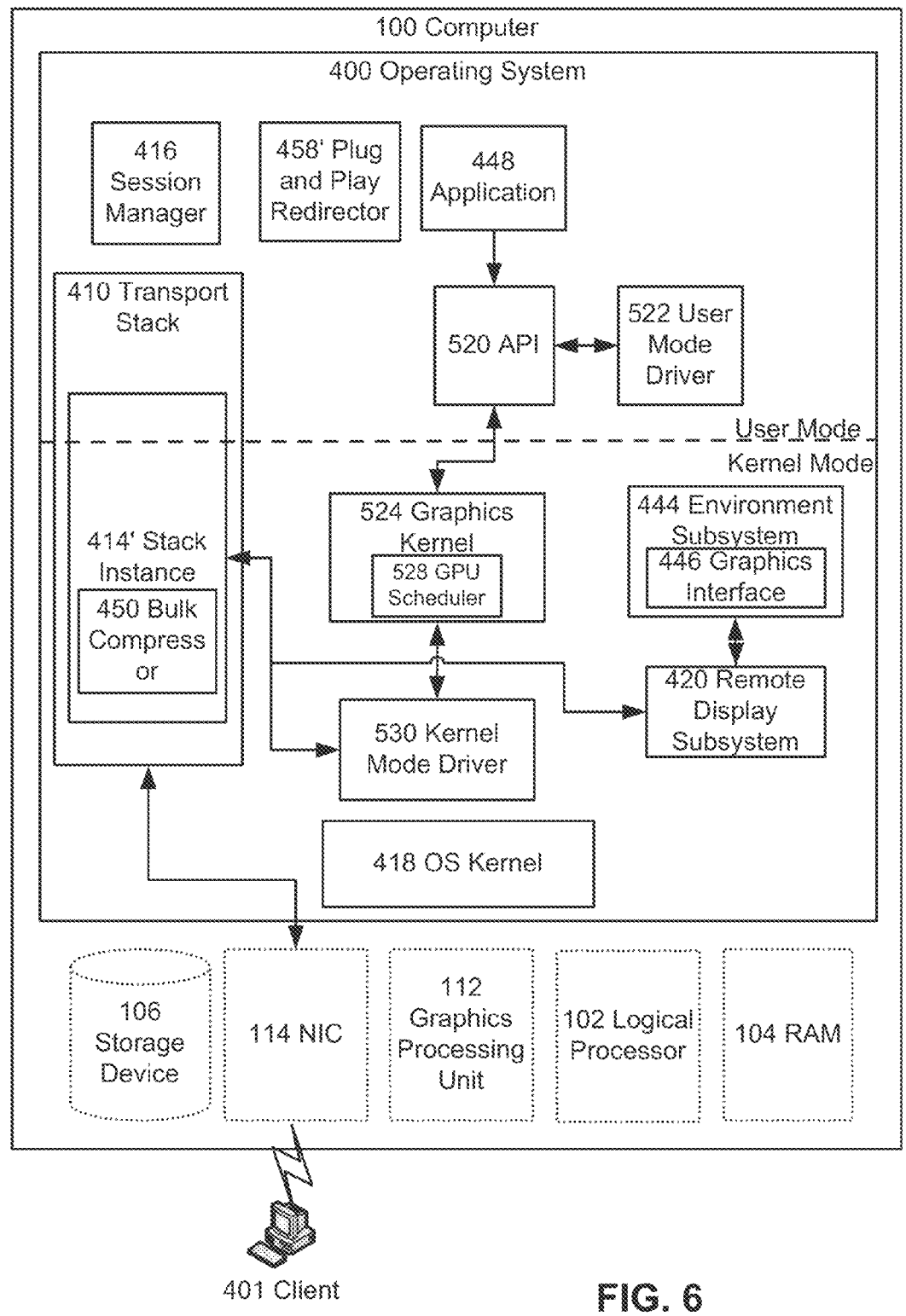
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

Multi-Link Remote Protocol

The process of compressing, encoding and decoding graphics data as referring to herein may generally use one or more methods and systems described in commonly assigned U.S. Pat. No. 7,460,725 entitled "System And Method For Effectively Encoding And Decoding Electronic Information," hereby incorporated by reference in its entirety.

In various methods and systems disclosed herein, improvements to the transmission of remote presentation graphics data to a client computer may be implemented to provide a more timely and rich user experience, in particular when providing a remote presentation session to a client computer in a virtual machine environment. The embodiments disclosed herein for encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

In remote desktop scenarios the graphics content of a user's desktop located on a host computer (e.g., the server) is typically streamed to another computer (e.g., the client). The server and the client will exchange the desktop graphics data in a well defined protocol or format. Microsoft's™ Remote Desktop Protocol (RDP) is an example of such a protocol. The RDP protocol is a stream oriented protocol that may use a stream based transport such as the Transmission Control Protocol (TCP) for exchanging data with the client. Protocols such as the TCP protocol typically exhibit high latency especially when the underlying transport is a wide area network (WAN) connection. If such a link is used for RDP traffic, such latencies may result in a negative user experience because the desktop graphics data may be delivered to the client in a time delayed fashion.

Accordingly, when providing a remote presentation session with a client computer using a protocol such as RDP, in some scenarios it may be desirable to execute the protocol over a lossy transport. For example, when a particular link is experiencing a high loss rate, the use of some stream-based protocols such as TCP may result in a significant delay. In such protocols, when data packets are not properly received or lost, the lost data packets must be retransmitted before progress can be made in the processing of the received data. Thus in such cases it may be advantageous to use a lossy datagram transport mechanism rather than a streaming lossless transport mechanism. Lossy protocols can be any type of protocol that may generally be characterized as protocol with lossy semantics. Such protocols may not provide verification of delivery, retransmission of lost data, and implied or explicit ordering of data packets. Such protocols may also be referred to as a datagram protocol. By being able to transmit data on a lossy datagram protocol, much of the delay caused by recovery mechanisms for lost packets may be avoided. In various embodiments disclosed herein, methods are described that address the above issues by providing a loss tolerant graphics exchange protocol and thus allowing the use of a non-stream based protocol such as User Datagram Protocol (UDP).

It is also desirable to be able to recover the lost data packets rather than ignoring the lost packets and not rendering the lost data on the client side. If such data recovery is desired, then it may be necessary to employ mechanisms for recovering from a link loss. It is thus desirable to develop a mechanism that can provide a lossy stream type link to support protocols such as RDP and also provide a mechanism to recover lost data packets as in a lossless channel.

In some embodiments, some of the RDP specific encoding techniques may be modified in such a way that the data can be transmitted over transports without guaranteed packet delivery. In one embodiment, the desktop graphics data may be encoded in individual frames, each frame comprising self-contained graphics elements that fit in a small number of User Datagram Protocol (UDP) protocol data units (PDUs). The PDUs may then be sent to the client on a separate UDP link instead of the TCP link. On the client side, the client may detect which graphic elements within a frame were "lost" as a result of dropped UDP packets and request a refresh from the server through the lossless channel (i.e., the TCP link).

Lossless protocols such as TCP require more overhead to provide guaranteed delivery and data packet ordering. Such protocols require that the transport or lower level layer provide mechanisms to acknowledge receipt of the data and if necessary to retransmit the data. Such overhead results in data transmission latency. However, if a lossy link is used that does not require such overhead, the rendering system may continue to render the received data with the assumption that lost data can be recovered at a later time. By using a combination of protocols below the remote presentation application layer, the objectives of the remote presentation application may be supported while data recovery mechanisms can be employed resulting in effective video data transmission that is more targeted for the type of data being transported. For example, if a client screen is being rendered and part of the screen has not been received, then the employment of the combination of protocols may enable decisions such as notifying the server that some data was not received. Furthermore, the server may determine that the missing data was already retransmitted and that it does not need to send more data.

By using such a mechanism, graphics data can be efficiently streamed using a lossy protocol with lower transport overhead and using a lossless protocol over a second channel to extend information to allow for data recovery. For example, in one embodiment, a hybrid mode can be established wherein a lossless transport such as TCP is used as a control channel. By using TCP as a control channel, the requirements for such a link can be simplified while maintaining the advantage of interoperability with existing protocols that use a lossless streaming protocol.

Figure 7:
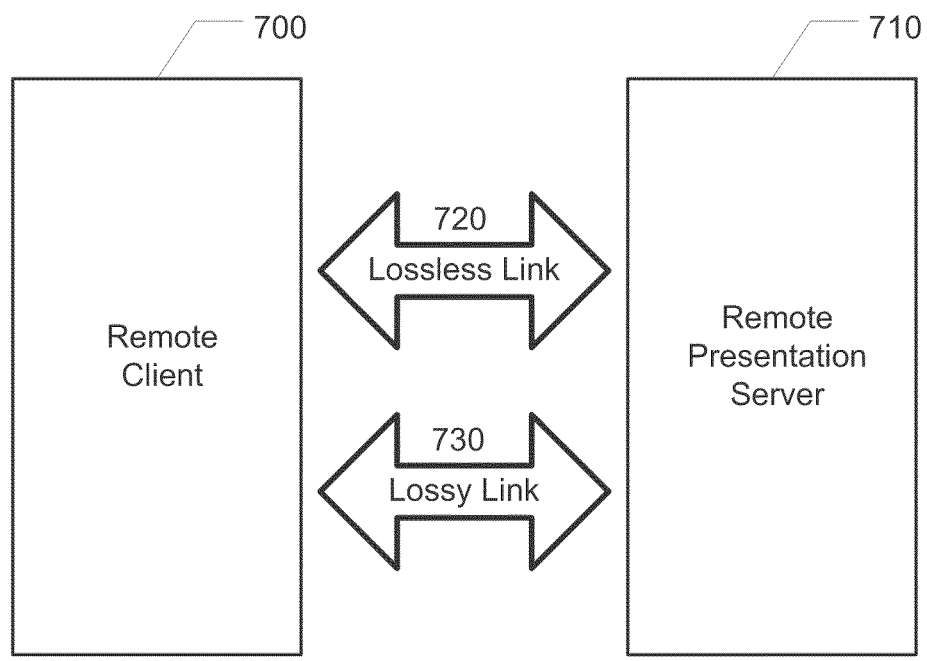
FIG. 7 illustrates an overview of some of the processes disclosed herein.

In one embodiment, a secondary UDP connection may be provided for transmitting the graphics data. FIG. 7 depicts a connection between a remote presentation server 710 and a remote client 700. In typical remote presentation configurations, the client and the server exchange information through the lossless link 720. Such information may comprise both control and graphics data. In an embodiment, a lossy link 730 is added to the connection between the client and the server. The lossy link 730 may be used to exchange the graphics data. The lossless link 720 may be used for control type data, such as a list of encryption keys or bitmap cache confirmation.

In one embodiment, a first connection may be established with the client computer, the first connection being established using a lossless protocol characterized by guaranteed packet delivery and packet order. Connection capabilities may then be established with the client computer to determine whether the client computer and/or the graphics source can support a second connection. The second connection may use a lossy protocol characterized by non-guaranteed packet delivery and packet ordering. If both endpoints can support the second connection, then the second connection can be established. Once established, the first connection can be used to manage graphics data transmission to the client computer and the second connection can be used to transmit the remote presentation graphics data to the client computer. Thus in some embodiments a first connection using a lossless protocol such as TCP can be established, and optionally the endpoints can negotiate to establish a second lossy link using, for example, UDP to more efficiently transmit graphics data. Additionally and optionally, the second connection can be terminated and the first connection used to transmit the remote presentation graphics data as a fallback transmission method. For example, if the network changes such that use of the second connection cannot be tolerated or if a connectivity issue arises because, for example, the lossy link cannot traverse a firewall, then the remote presentation session can degrade to use only the first connection as a fallback. In some embodiments this fallback mechanism can occur automatically.

It is advantageous to maintain a control channel over a lossless link while transmitting data over the lossy channel in order to exchange information regarding the status of the lossy link. For example, using the control channel the endpoints can exchange information as to whether the connection has been closed and otherwise manage the connection such as managing the lifetime of the connection. In some embodiments the client can send feedback to the server as to whether any expected data was not received. In one embodiment, the server or graphics source may receive from the client computer, using the first connection, feedback describing remote presentation graphics data that was not received. In response to the feedback, the server or graphics source may transmit, over the second (lossy) connection, the remote presentation graphics data that was not received. Thus in some embodiments, in the event of a data loss issue, rather than re-transmitting large portions of the data, the server or graphics source may only send any unreceived packets indicated by the client. In some embodiments, the server or graphics source may wait for a predetermined period of time for acknowledgements of data received. If there is no acknowledgment then the server or graphics source may assume that an unacknowledged data packet was lost and needs to be retransmitted.

In various embodiments, the types of data to be transmitted can be divided into two categories. One category can include data that should not use a lossy link such as, for example, a security handshake or capability negotiation. A second category can include data that can us a lossy link such as video data. The first category can also include data for management of the lossy data, such as data that indicates that a certain piece of the client screen was not received.

The first category may use a primary link that can generally be characterized as a lossless link that guarantees data delivery and provides indication of the order of the data packets. Lossless protocols can be any type of protocol that may generally be characterized as a protocol with lossless semantics. Such protocols may provide one or more of the following functions: verification of delivery, retransmission of lost data, and implied or explicit ordering of data packets. Higher level protocols for remote desktop presentation include Remote Desktop Protocol (RDP) which is used herein for illustrative purposes. However, the concepts and methods disclosed may be used in conjunction with other remote presentation protocols.

In one embodiment, the graphics updates may be partitioned into frames. A frame may contain information that represents a client screen for remote presentation during, for example, a virtual machine session. In some embodiments, the client may assume that any parts of the frame that were not received were encoded in lost packets and thus not received. While in the present disclosure the graphics elements used within a frame are assumed to be bitmaps, other types of graphics elements may also be used.

Figure 8:
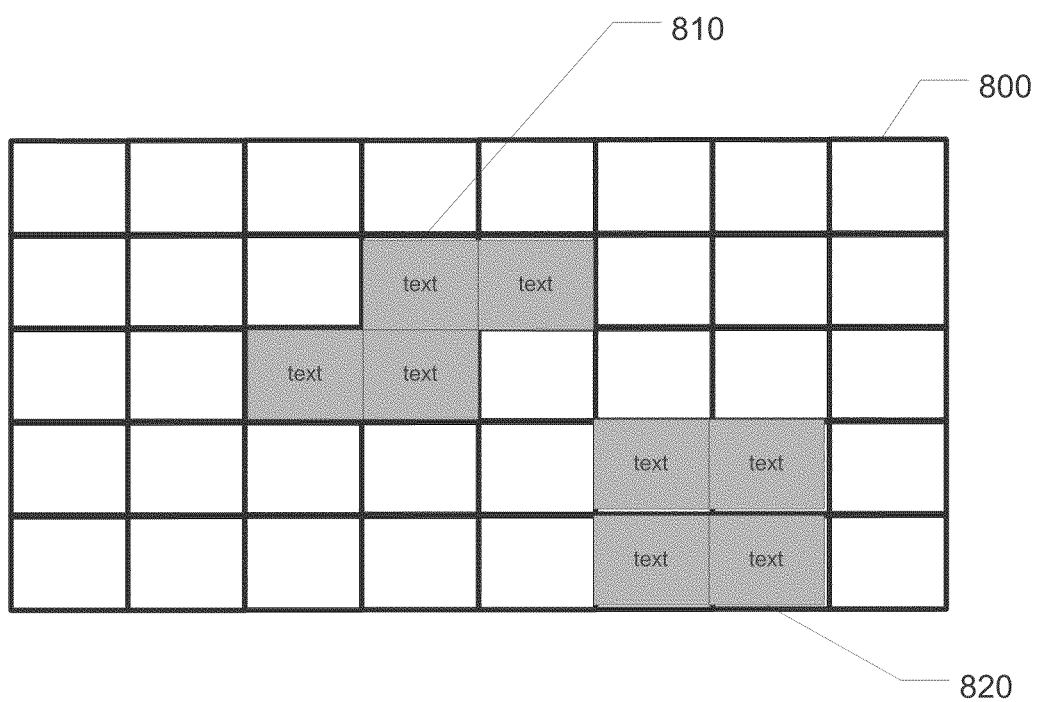
FIG. 8 illustrates an example of a client screen capture.

FIG. 8 depicts an example user screen 800 of a user's desktop divided into rectangular tiles. The desktop may be "tiled" in equally sized bitmaps, which may then be represented as a frame. In this example, the darkened tiles 810 and 820 represent tiles that have changed and are to be sent to the client. Thus in this case the frame that is sent to the client will contain two types of graphics elements. The tiles that are not changed may be represented as empty rectangles. The tiles that have changed may actually be sent as encoded bitmaps.

In standard RDP encoding, the bitmaps or graphics elements are typically encoded without regard to the size of the transport MTU. The MTU is the maximum transfer unit and represents the size, typically in bytes, of the largest protocol data unit. In some embodiments of the present disclosure, the graphics elements may be contained in either one or a limited set of underlying transport packets. If the graphics elements are contained in one packet, then the packets may be independent and the client will be able to extract useful information from each received packet. Thus in one embodiment, the size of the actual graphic element may be constrained to one MTU. For example, if the MTU size is 1480 bytes as is typical in a WAN, the server will be able to encode in one MTU a 32×32 pixel uncompressed monochrome bitmap. The server will also be able to encode a 32×32 32bpp bitmap that is compressed with an algorithm that cuts the size of the bitmap by approximately three times.

As discussed above, in some embodiments the disclosed protocol may operate on full frames. For example, the server may encode the screen content as a full frame, and the client may re-construct this content as a full frame. Any "missing" areas of the frame may be considered a result of lost PDUs. Thus in one embodiment, a graphics element contained in a PDU may contain sufficient information such the client can determine the frame that the graphics element belongs to as well as the position within the frame occupied by that element.

Figure 9:
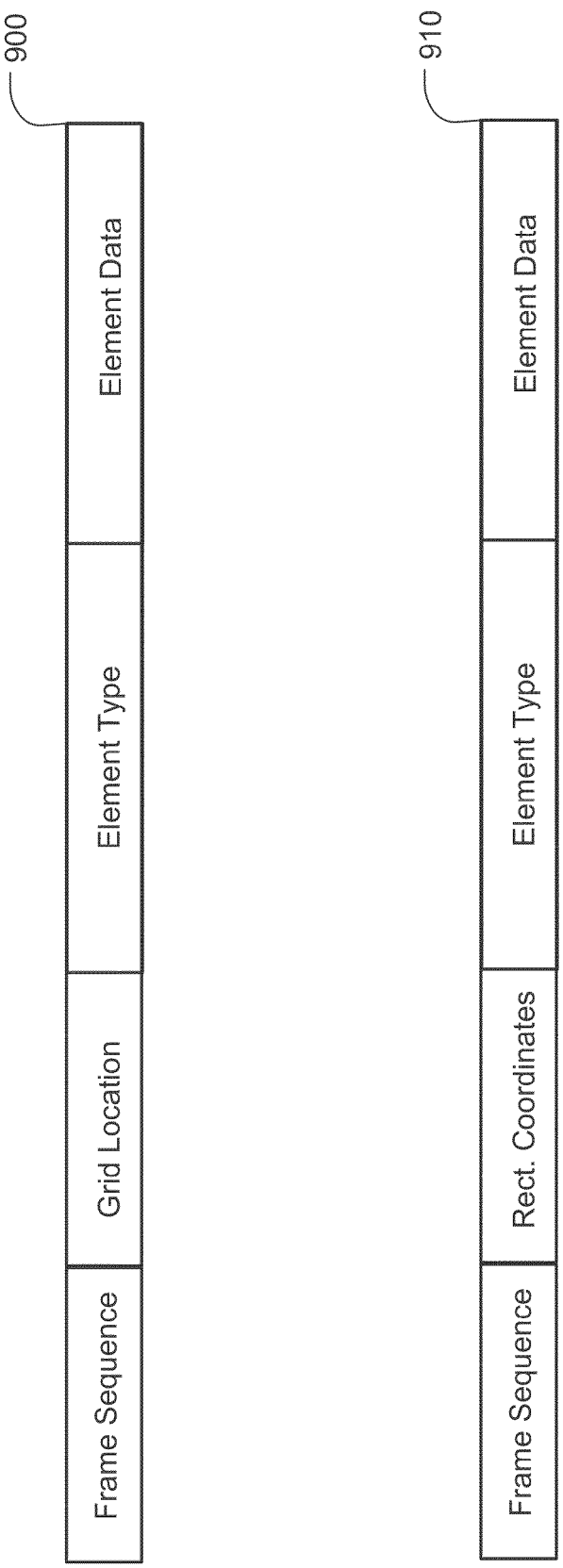
FIG. 9 illustrates an example frame structure incorporating aspects of the methods disclosed herein.

FIG. 9 exemplifies two example encodings of frame elements. In one embodiment illustrated by data packet 900, the PDUs may include a frame sequence number. This frame sequence number may be used by the client to determine the frame that the graphics element(s) contained in the PDU belong to. A change in the frame sequence number may also indicate the start of a new frame. While the frame sequence number need not be an absolute value, the number should be large enough to identify a frame transition in cases in which entire frames are lost.

In another embodiment illustrated by data packet 910, the elements encoded in a frame may contain geometry information. For example, if the graphics elements are equally sized bitmaps, then the bitmap's placement on the screen can be identified by the bitmap's position within the grid. If the elements can be of arbitrary geometry, then the graphics element position may be specified through rectangle coordinates.

In some embodiments, an element type may be provided that describes what type of graphics primitive is encoded in the PDU. For example, for areas that have not changed an "empty rectangle" element type may be used. Another example of a graphics type is an opaque rectangle or bitmap (i.e., the graphics element is not transparent and thus the bitmap of the previous screen area covered by the new screen area is not needed).

When data is transmitted over a lossy protocol, a number of issues may need to be addressed in order to support remote presentation protocols. For example, bulk compression is typically applied to the remote presentation data prior to transmission. Bulk compressors typically operate by encoding data as a function of earlier data. However, as discussed above it is desirable for graphics elements to be encoded into one MTU, and thus in the case of a lossy transport the data necessary for de-compression should be self contained within a PDU. Accordingly, the bulk compression history may have to be reset before compressing/de-compressing each PDU.

If a multiple PDU transport technique is used, then the compression history can be reset only after all the PDUs within an update are compressed. Bulk compression is a history-based compression technique and thus if one of the packets in the stream is lost, then the state may become inconsistent and synchronization may be lost. In one embodiment, the compression context can be reset after each packet is transmitted, thus allowing each packet to be decompressed independently. In another embodiment, the number of packets to be included in the decompression may be determined dynamically. For example, the compression history may be reset after every four packets. If one of the data packets are lost, then the server or graphics source may need to resend all four packets. If the data packet loss rate is too high, causing repeated retransmissions of packet groups, then the compression history reset point may be balanced based on the network conditions or other factors such as the probability of losing a packet and the efficiency of sending more data packets before resetting the context. In one embodiment the number of packets in the compression history may be adjusted from one to N.

When data is transmitted over a lossy protocol, issues related to encryption of the data may also need to be addressed. It is typically desirable to encrypt the graphics elements or frames. Examples of encryption schemes include Secure Sockets Layer (SSL) that are typically used to provide security for communications over networks. In the various disclosed embodiments, encryption may need to be accomplished within the context of a PDU. To provide security in this context, it may be necessary for the server to generate new encryption keys more often and communicate those keys to the client. The context for the encryption scheme should also be determined when using a lossy link due to the possibility of lost data packets. The server may communicate to the client the new encryption key as well as the packet for which the new encryption key should be used. In one embodiment, a non-encrypted sequence number can be provided for each packet. The encryption keys may be sent through the reliable TCP link along with the range of packet numbers that the keys apply to.

While the context can be set at one packet, encryption keys can be used for blocks of data. For example, a sequence ID can be provided to identify, for one or more packets, which encryption context is to be used. In one embodiment, an encryption key for decrypting the encrypted remote presentation graphics data can be transmitted to the client along with an indication of a range of data packets for which the encryption key should be used. Encryption keys can be renegotiated so that the client can be sent a new set of keys to be used for packets to be received from a given epoch.

Additionally, each packet may be associated with a unique sequence number and a unique frame number to further associate keys with applicable data packets. In one embodiment, a predetermined number of encryption keys may be transmitted to the client using the lossless connection, and a selection identifying one of the encryption keys to be used for decrypting the remote presentation graphics data may then be transmitted to the client computer. In another embodiment, a schema can be provided wherein the server sends a plurality of keys. A specific key may be selected by applying a modulo function to the packet sequence number.

When transmitting the remote presentation graphics data over the lossy link, in some cases it may be desirable to maximize the amount of graphics data inserted into the MTU up to the MTU limit. Using more of the MTU capacity may provide greater efficiency because each packet will carry more graphics data while the protocol overhead such as headers or underlying per-packet delays remain fixed. Higher efficiency may provide an improvement in bulk protocol throughput. Furthermore, when a packet is lost it may be advantageous to minimize the number of packets that need to be retransmitted and thus it may be advantageous to reduce the interdependencies between packets. Thus in some embodiments it may be advantageous to package the data into the packets such that each packet is as much as possible independently actionable and decodable.

In some cases, however, graphics elements can be fit into more than one MTU or a small number of MTUs. The number of MTUs can be adapted based on the loss level that is expected or has been detected on the link. The size of a data packet may be increased but more data will be lost if the packet is lost. On the other hand, smaller packets do not compress as well from a bulk compression perspective and so the amount of data to be placed on a packet can be determined in consideration of the above factors.

In some cases, constraining the graphics element size to the MTU size might be limiting in terms of what kind of graphics elements can be encoded. For example, a non-compressed 32×32 bitmap may requite four times the size of a WAN MTU. If it is desirable to encode larger graphics elements, in some embodiments an algorithm may be applied so that the client can re-assemble such elements from multiple MTU size packets. In such situations, if a packet that contains graphics data is lost, it may not be possible to reassemble the original graphics element and any other packet containing information specific to that element may have to be discarded.

As previously mentioned, in some embodiments the disclosed protocol is based on the idea that the client will expect fully described frames. Accordingly, the client may keep track of the areas that were received for a frame. Once the client detects that a new frame has started, the client may initialize a region object that corresponds to the whole screen and the region object can be used for tracking the received regions as represented by the received encoded data. As updates are received, the client may subtract the area occupied by the updates from the tracking region. If all the updates in a frame are received, then the tracking region will be essentially empty. If the area is not empty, then the client can determine that not all the graphics updates were received. In that case the client may request a refresh from the server for that particular area through the TCP control channel.

Some screen elements within a frame, such as rectangles that have not changed, may be small and can be encoded within a single PDU. However, the loss of such a PDU may cause the client to request from the server an update for the entire area that was described by the empty rectangles. Providing such an update may be costly because of the multiple screen areas involved. To avoid the consequences of the loss of such packets, it may be desirable to send duplicate PDUs for elements such as data describing non-changed rectangles.

The methods disclosed herein are not limited to a particular type of graphics data such as bitmaps. The disclosed methods can apply to any type of graphic object. For example, the graphics data may comprise a description of entities to be drawn. Generally the lossless channel can be used to notify the client of the type and nature of the data that will be transmitted and the expected result after rendering. The actual graphics data can then be transmitted to the client on the lossy channel, and the client can compare what was actually received and the result of the rendering actions to determine if any data was missing or if there is a discrepancy between what was expected in the received data or as a result of performing the expected actions on the data. In one embodiment the client can note any transactions not received or screen areas that have not been updated and notify the server of the discrepancy. In other embodiments, the client make some intelligent decisions such as determining that only a small portion of the screen is missing and determining to wait longer for the missing data or determine that the data is not needed.

The above described techniques may be applied to multiple monitor scenarios. A component on the server may, for example, determine the number of video presentation paths from the video presentation network information as maintained by the server. Each video presentation source may be provided with a set of video data as described above.

As described above, a remote client may open a remote presentation session. The session may be associated with a virtual machine partition wherein some services are provided by a host partition. In some cases the virtual machine may render into a virtual device via a GPU. The rendering for the remote client's virtual machine session may be accomplished by accelerating the rendering using one or more GPUs (real or virtual) in another virtual machine (the parent or host virtual machine) or on a remote machine (that acts as a graphics server) that is shared by many guest virtual machines. An image capture component on the parent or host virtual machine may retrieve snapshots of the client screen images. The captured images can be optionally compressed and encoded prior to transmitting to the client. The compression and encoding can take place on the host (parent) virtual machine or the child or guest virtual machine. As mentioned, a remote presentation protocol such as Remote Desktop Protocol (RDP) may be used to connect to the virtual machines from remote clients and for transmitting the desktop images. In this manner, a remote user can experience remote working sessions via a remote login.

In some cases the graphics data may be generated on the host virtual machine and when the client is connect to the guest virtual machine, the guest virtual machine may have to communicate through a virtual bus, mapped memory, or other mechanisms to receive the graphics data from the host, which in turn is transmitted to the client. Such a setup can introduce excessive CPU/bus usage that can affect the remote client's user experience. Thus in various embodiments, methods and systems are further disclosed that allow the client to receive data directly from the host and thus eliminate a portion of the latency.

Figure 10:
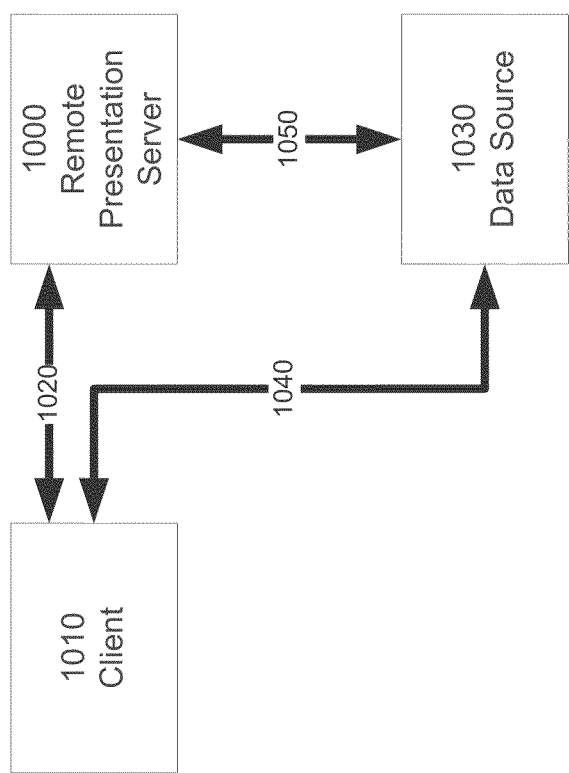
FIG. 10 illustrates an example architecture illustrating aspects of the methods disclosed herein.

When multiple data channels are established between the client and the guest virtual machine partition, it may be desirable to provide mechanisms to split the transport links. For example, referring to FIG. 10, in a typical remote presentation protocol a server 1000 and client 1010 may exchange data through a server-to-client connection 1020. In some embodiments, the connection may be a TCP connection. However, in some cases at least a portion of the data sent to the client 1010 may actually originate on a third virtual machine 1030. The server 1000 in this case may act as a tunnel by receiving the data through another connection 1050 and forwarding the data from the third virtual machine 1030 to the client 1010. By tunneling the data in this fashion, the flow of data to the client 1010 may be less efficient than if virtual machine 1030 sent the data directly to the client 1010. In an embodiment, a method and system is disclosed through which the client 1010 can establish a connection to virtual machine 1030 and receive the data directly through a direct connection 1040 between virtual machine 1030 and client 1010.

In another embodiment, the virtual channel traffic may be separated over multiple connections with the purpose of allowing better flow control between data channels. In an embodiment, the multiple connections may comprise TCP or UDP connections. Some remote presentation protocols such as the RDP protocol may provide mechanisms through which remote presentation data (e.g., audio data) can be sent through a UDP channel instead of the main TCP connection.

Thus various embodiments are disclosed in which a remote client is allowed to access at least a part of a connection service located on alternate sources other than the primary remote presentation server. Typically remote presentation protocols use a connection from one client to one server. Using the disclosed mechanisms herein, a remote presentation connection can be considered as a set of connections to a set of servers—with one server being managing the "main/standard" remote connection. The disclosed mechanism can be implemented in a variety of scenarios. For example, a media stream can be sent directly to the client by a server who hosts or streams a number of surveillance videos that should be sent to that client. In some embodiments, the remote presentation virtual channels may be split into multiple connections with the purpose of allowing better flow control. Some embodiments may be implemented in a virtual machine environment for cases in which the data to be transferred through a data channel is located in the host virtual machine partition but the remote endpoint is located on the guest virtual machine partition.

Figure 11:
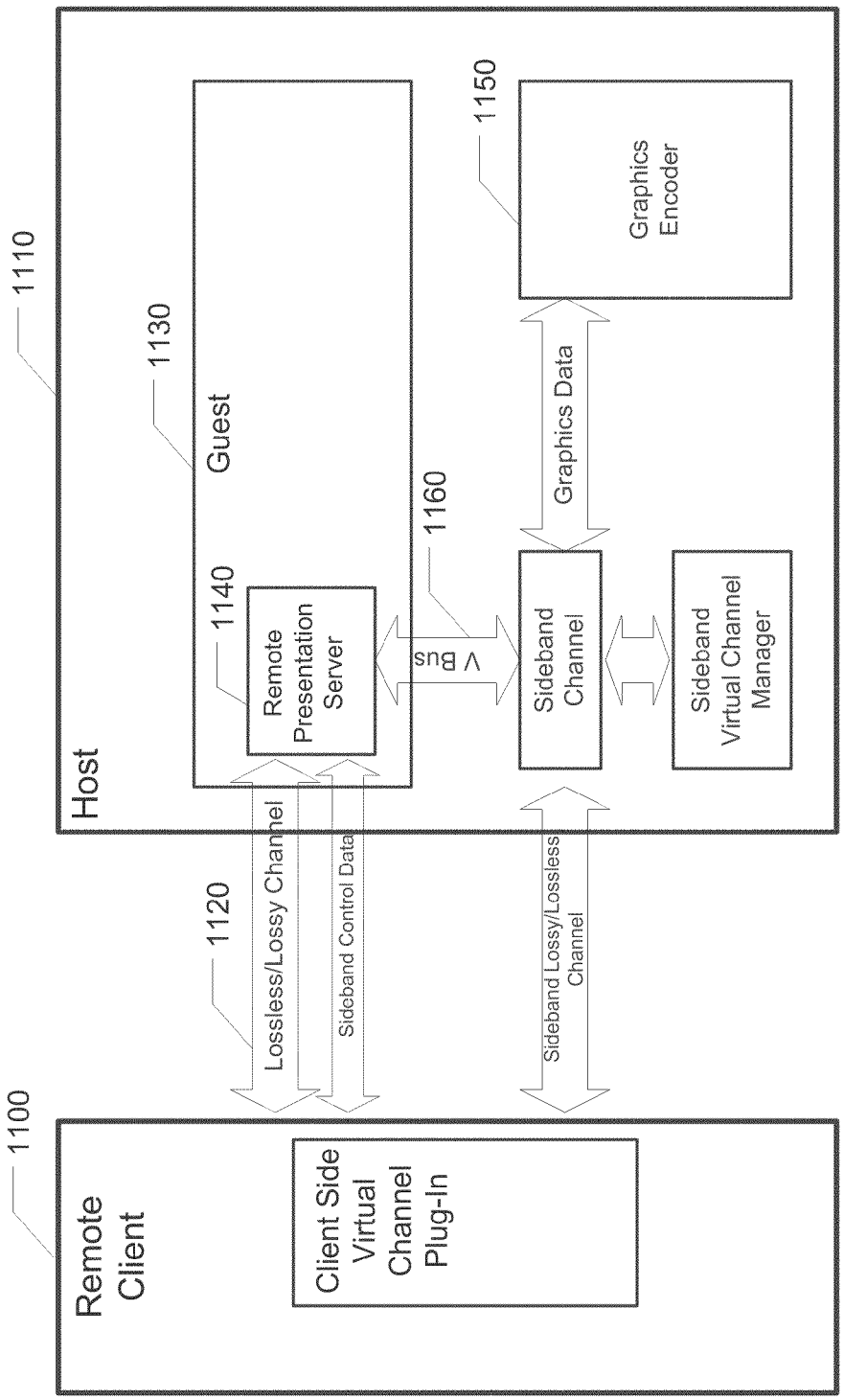
FIG. 11 illustrates an example architecture incorporating aspects of the methods disclosed herein.

Referring to FIG. 11, the remote client 1100 must access graphics data that is available on the host partition 1110 of a host virtual machine. The actual connection 1120, however, is terminated in the guest operating system 1130 within the remote presentation server 1140. Typically in such a case, the remote presentation server 1140 located in the guest OS 1130 will have to actually act as a proxy between the host operating system graphics encoder 1150 and the client 1100. Such an arrangement may introduce performance issues since proxying the data requires an additional roundtrip over the host-to-guest virtual machine bus 1160. In various embodiments, this roundtrip can be eliminated by instructing the client to connect directly to the remote presentation components located in the host operating system.

Figure 12:
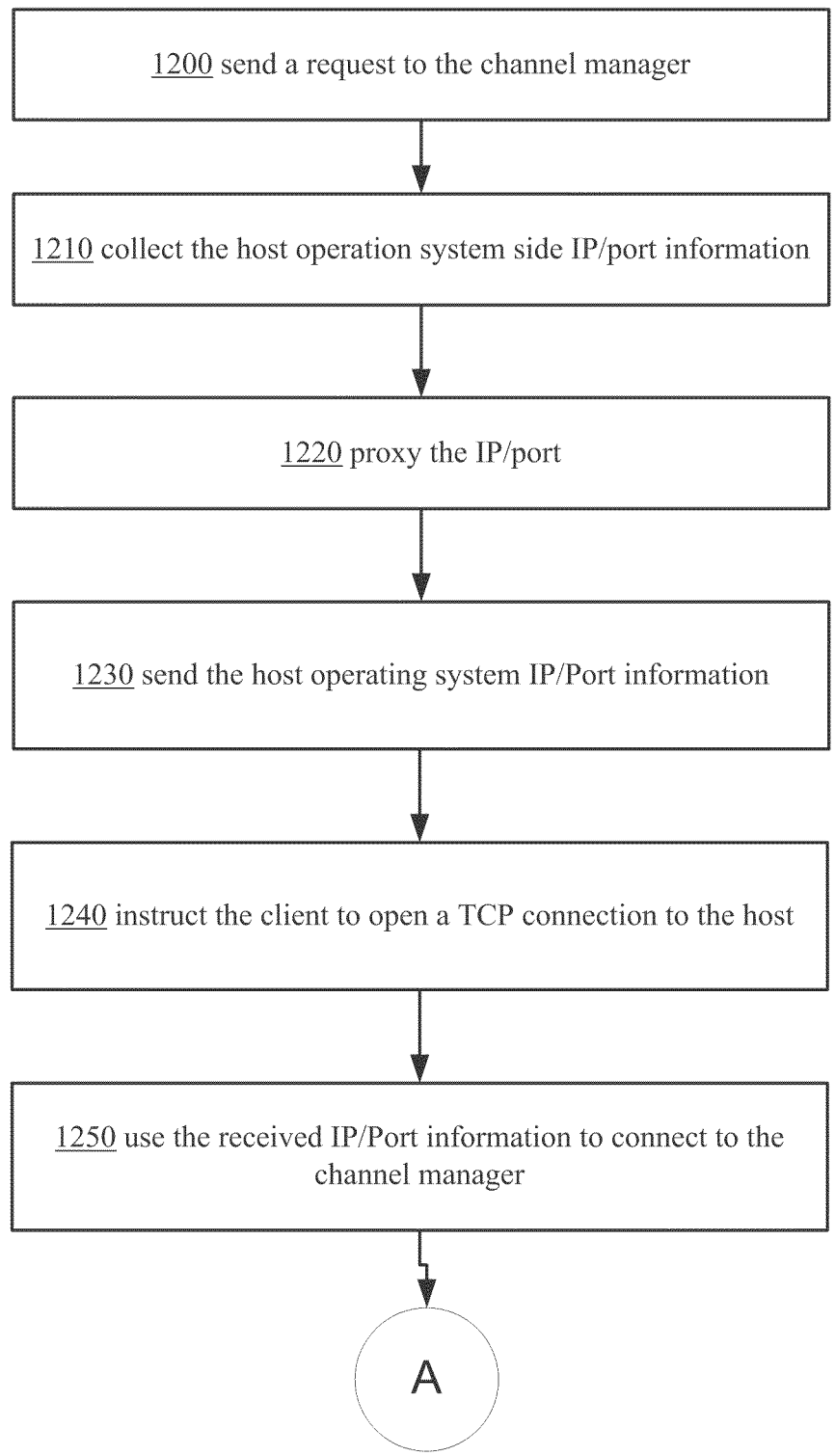
FIG. 12 illustrates an example of an operational procedure for processing graphics data for transmission to a client computer.

In one embodiment and as illustrated by FIG. 12, the following steps can be performed to enable the graphics encoder to establish a connection to the client. The steps below assume that a remote presentation connection using TCP is already established between the client and the server.

First, the graphics encoder may send a request 1200 to the channel manager to establish a connection to the client. The channel manager may then collect the host operation system side IP/port information 1210 and sned the IP/port 1220 to the remote presentation server in the guest virtual machine partition.

The remote presentation server in the guest partition may then send the host operating system IP/Port information 1230 to the client and instruct the client to open a TCP connection to the host 1240. The client may use the received IP/Port information to connect 1250 to the channel manager in the host operating system.

Figure 13:
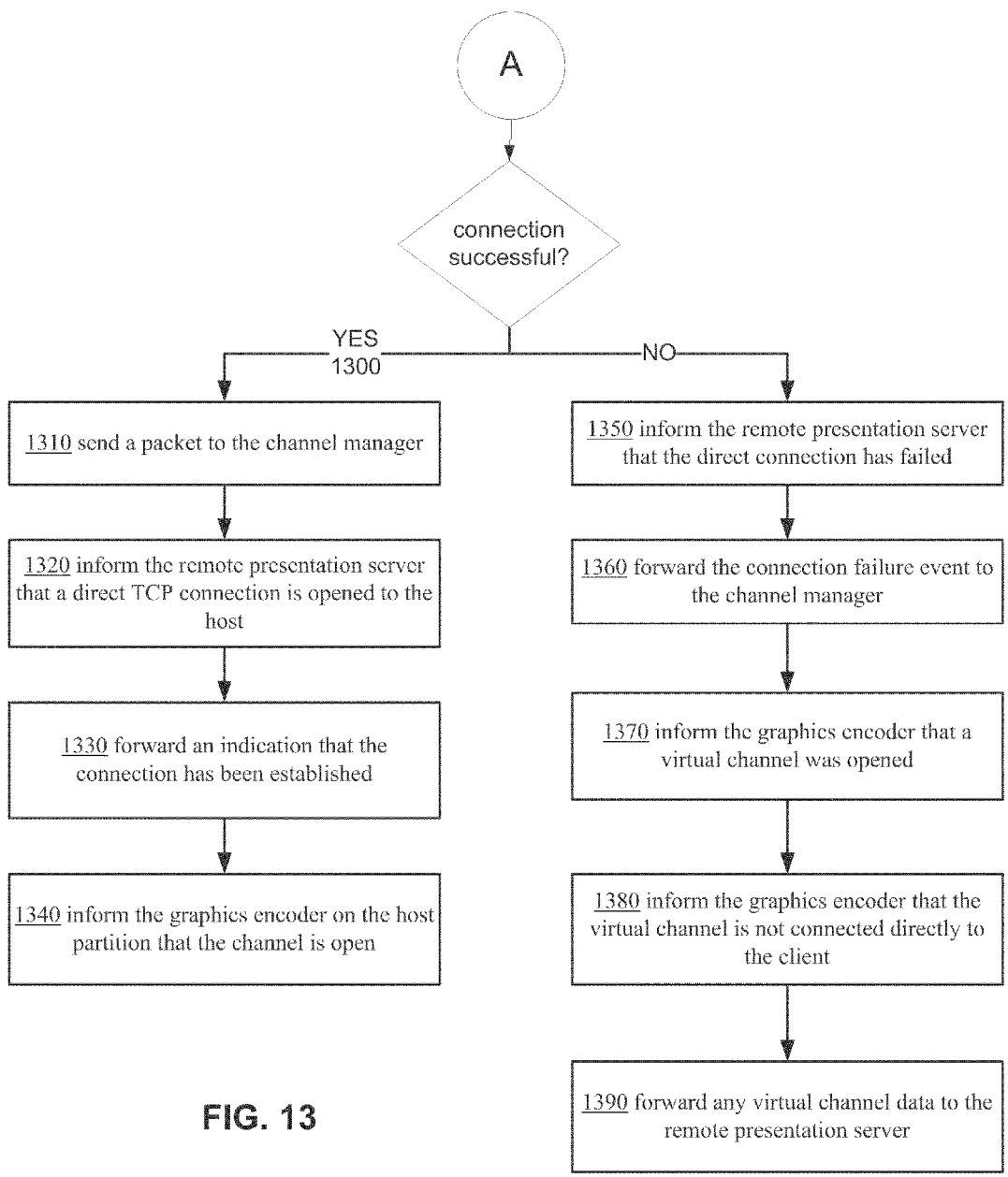
FIG. 13 illustrates an example of an operational procedure for processing graphics data for transmission to a client computer.

Referring now to FIG. 13, if the client-to-host connection is successful 1300 then the following actions may be performed:

The client may send a packet to the channel manager 1310 that indicates what virtual channel the TCP connection should be used for. The client may then inform 1320 the remote presentation server that a direct TCP connection is opened to the host operating system endpoint. The connectivity information can be sent through the client-to-guest connection. In an embodiment, the client may send a control packet to provide this information.

The remote presentation server may forward an indication 1330 that the connection has been established to a channel manager on the host partition. In one embodiment, the indication may be a "Channel Open" message. The channel manager may inform the graphics encoder 1340 on the host partition that the channel is open.

If the client-to-host connection fails, then the following actions may be performed:

The client may inform the remote presentation server 1350 that the direct connection has failed. The remote presentation server may then forward the connection failure event 1360 to the host partition side channel manager. The host partition side channel manager may inform the graphics encoder 1370 that a virtual channel was opened. The connectivity information can be sent through the client-to-guest connection.

The host partition side may optionally inform the graphics encoder 1380 of the fact that the virtual channel is not connected directly to the client. The graphics encoder may thus be informed that the virtual channel may experience some additional latency. Optionally, the host partition may explicitly inform the graphics encoder of the latency issues. The graphics encoder may also choose to apply an algorithm that may compensate for the host/guest marshaling by compressing the graphics data sent to the host at a higher rate (through more CPU cycles or higher level of loss).

The host partition channel manager may then forward any virtual channel data 1390 to the remote presentation server so that the server can proxy the virtual channel data to the client through the pre-established remote presentation connection.

In an embodiment both a guest and host component to the channel manager can be provided. The connectivity success information can be propagated to the host side either by a packet received by the guest component on the initial host to guest connection or by the actual TCP connection on the host.

In some embodiments, the mechanisms described may be implemented in configurations in which the client, server and graphics encoder are located on interconnected physical machines. The mechanisms may also be implemented in configurations in which multiple data encoders/produces use one or more TCP links to exchange data directly with the client.

Figure 14:
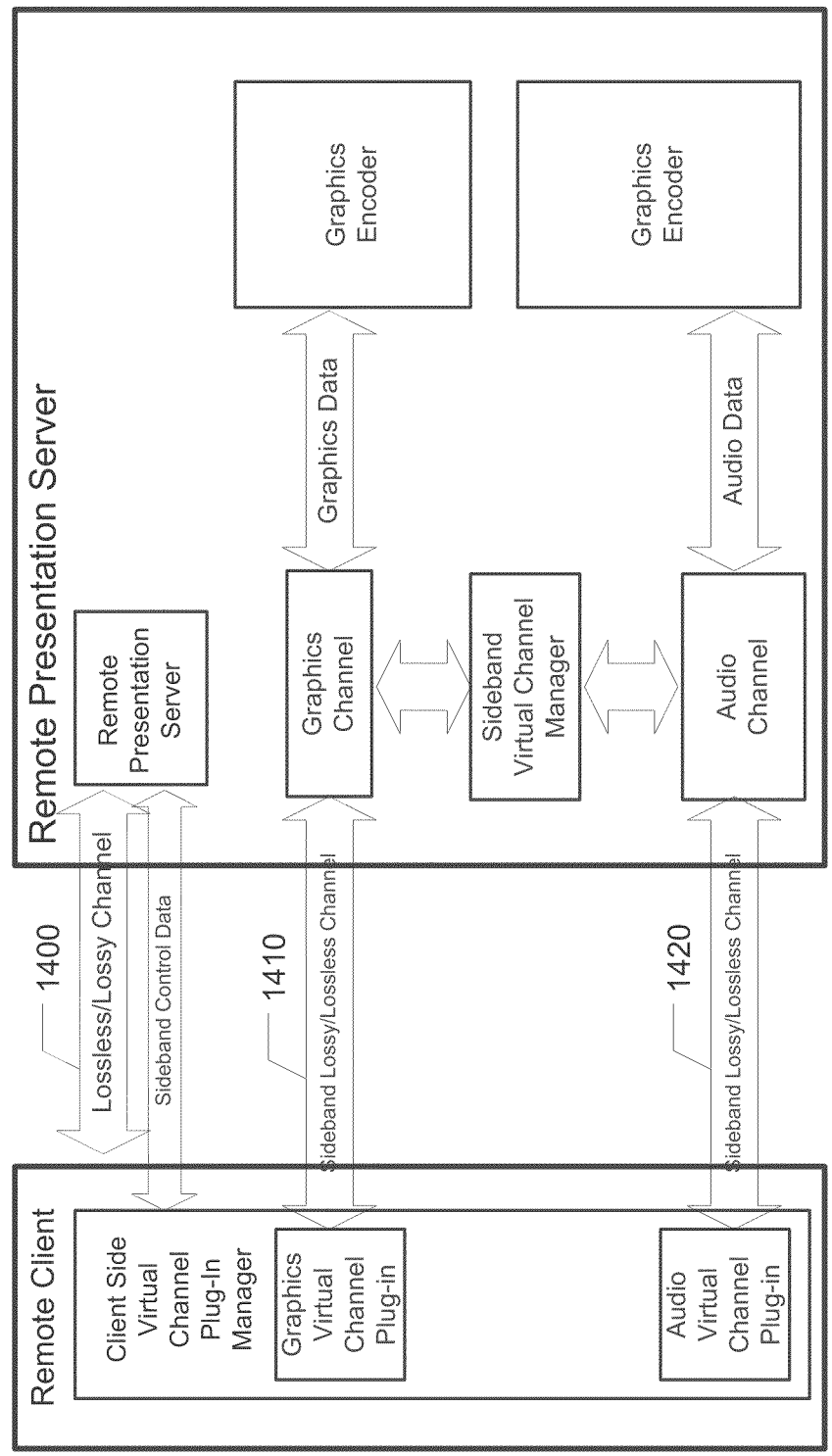
FIG. 14 illustrates an example architecture incorporating aspects of the methods disclosed herein.

Referring to FIG. 14, illustrated is an example architecture in which the virtual channel traffic is split over multiple TCP connections 1400 1410 1420. The virtual channel traffic may be split to improve flow control between, for example, the audio channel 1420 and the graphics channel 1410. The flow control results from the fact that the audio data packets are typically smaller than the graphics packets and if they are split on separate TCP channels, it is likely that the audio data will arrive at the client without delays. Without this split the audio packets may have to wait until the larger packets are sent which makes it difficult to give the audio data priority. Furthermore, larger packets tend to encounter more loss so the latency for the TCP link that contains graphics packets will be higher. The methods already described above may be applied with the addition of connecting the actual virtual channels to the same virtual machine as the main remote presentation connection. In this case, it may be desirable for the channel manager to share the port/IP with the standard remote presentation server.

When the channel manager shares the port/IP with the standard remote presentation server, it may be necessary to distinguish between a standard incoming remote presentation connection and a virtual channel end-point connection. In an embodiment, this can be accomplished by using the standard remote presentation pre-connection protocol to identify the connection as a virtual channel connection. The information necessary to pair the TCP incoming connection with a virtual channel may also be exchanged during the pre-connection using, for example, a flag passed by the client in the first packet sent for a standard RDP connection.

Figure 15:
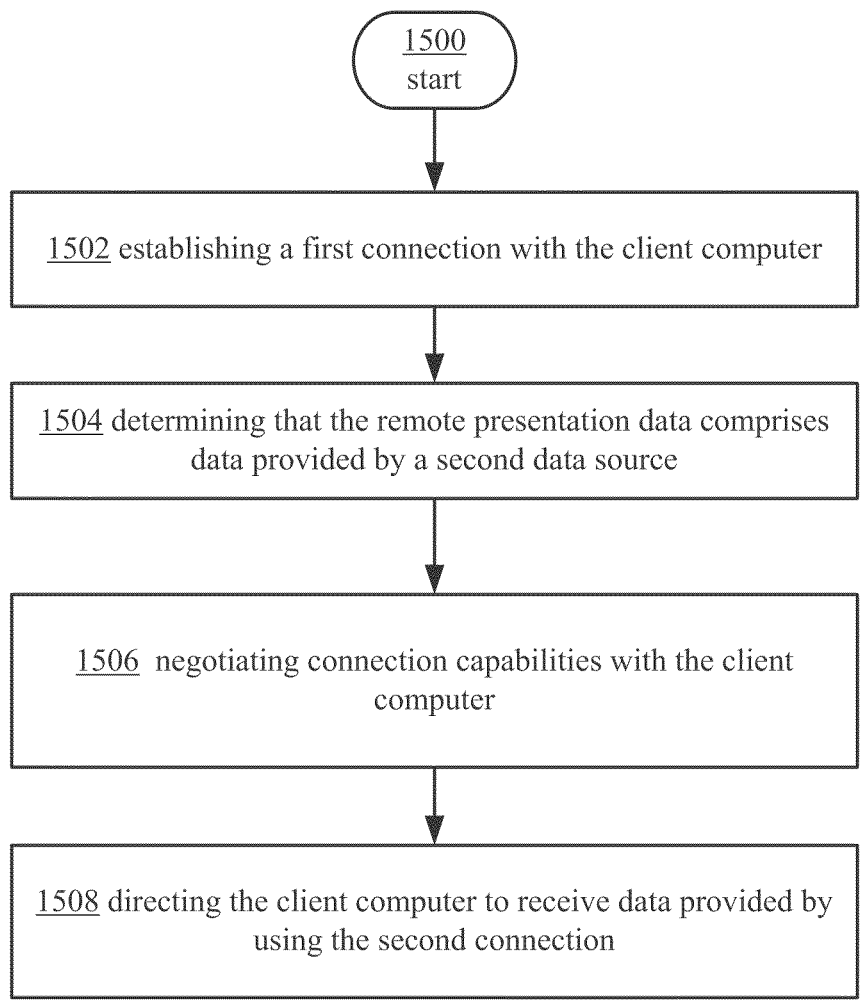
FIG. 15 illustrates an example of an operational procedure for processing graphics data for transmission to a client computer.

FIG. 15 depicts an exemplary operational procedure for transmitting remote presentation data to a client computer, including operations 1500, 1502, 1504, and 1506. Referring to FIG. 15, operation 1500 begins the operational procedure and operation 1502 illustrates establishing a first connection with the client computer, the first connection established using a lossless protocol characterized by guaranteed packet delivery and packet order. Operation 1504 illustrates determining that the remote presentation data comprises data provided by a second data source. Operation 1506 illustrates negotiating connection capabilities with the client computer to determine that the client computer can support a second connection and establishing the second connection with the data source, wherein the second connection is established using one of a lossless protocol characterized by guaranteed packet delivery and packet order or a lossy protocol characterized by non-guaranteed packet delivery and packet ordering. Operation 1508 illustrates directing the client computer to receive said data provided by the data source using the second connection.

Figure 16:
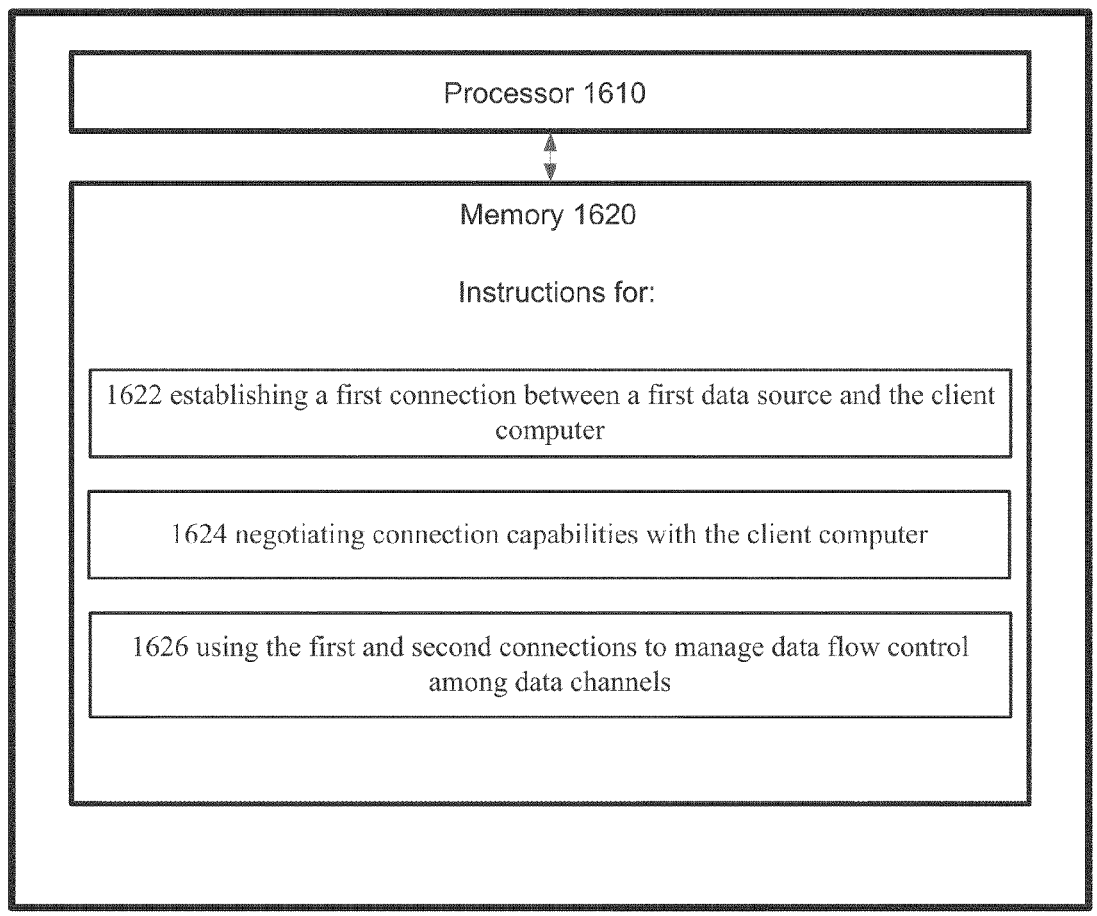
FIG. 16 illustrates an example system for processing graphics data for transmission to a client computer.

FIG. 16 depicts an exemplary system for transmitting remote presentation data to a client computer. Referring to FIG. 16, system 1600 comprises a processor 1610 and memory 1620. Memory 1620 further comprises computer instructions configured to transmit remote presentation graphics data to a client computer. Block 1622 illustrates establishing a first connection between the first data source and the client computer, the first connection established using a lossless protocol characterized by guaranteed packet delivery and packet order. Block 1624 illustrates negotiating connection capabilities with the client computer to determine that the client computer can support a second connection and establishing the second connection with the second data source, wherein the second connection is established using one of a lossless protocol characterized by guaranteed packet delivery and packet order or a lossy protocol characterized by non-guaranteed packet delivery and packet ordering. Block 1626 illustrates using the first and second connections to manage data flow control among data channels used by the client computer to receive the remote presentation data.

Any of the above mentioned aspects can be implemented in methods, systems, computer readable media, or any type of manufacture. For example, per FIG. 17, a computer readable medium can store thereon computer executable instructions for using the first and second connections to manage data flow control among data channels used by the client computer to receive the remote presentation data. Such media can comprise a first subset of instructions for establishing a first connection with the client computer, the first connection established using a lossless protocol characterized by guaranteed packet delivery and packet order 1710; a second subset of instructions for negotiating connection capabilities with the client computer to determine that the client computer can support a second connection and establishing the second connection, wherein the second connection is established using one of a lossless protocol characterized by guaranteed packet delivery and packet order or a lossy protocol characterized by non-guaranteed packet delivery and packet ordering 1717; and a third subset of instructions for using both first and second connections to send the remote presentation data to the client computer 1714. It will be appreciated by those skilled in the art that additional sets of instructions can be used to capture the various other aspects disclosed herein, and that the three presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. In a computing system comprising a processor and memory, a method for transmitting remote presentation data to a client computer, the method comprising:
   establishing a first connection between a first data source and the client computer, the first connection established using a lossless protocol;
   determining that the remote presentation data comprises first data provided by the first data source and second data provided by a second data source;
   negotiating connection capabilities with the client computer to determine that the client computer can support a second connection and establishing the second connection with the second data source, wherein the second connection is established using one of a lossless protocol or a lossy protocol; and directing the client computer to maintain the first and second connections to manage data flow control in virtual channels formed between the client computer and at least one of the first data source and the second data source via the first and second connections, the virtual channels used by the client computer and to receive said remote presentation data including said first data using the first connection and said second data using the second connection.

2. The method of claim 1, wherein the lossless protocol is TCP and the lossy protocol is UDP.

3. The method of claim 1, further comprising terminating the second connection and using the first connection to transmit the remote presentation data as a fallback transmission method.

4. The method of claim 1, wherein said data provided by the second data source comprises graphics data.

5. The method of claim 1, wherein said establishing the second connection comprises receiving connection information for the second data source and sending the connection information to the first data source.

6. The method of claim 5, wherein said establishing the second connection further comprises sending the connection information to the client computer and instructing the client computer to establish the second connection using the connection information.

7. The method of claim 6, wherein said establishing the second connection further comprises receiving an indication from the client computer of a data channel to be associated with said second connection.

8. The method of claim 1, wherein said establishing the second connection is managed by a channel manager.

9. The method of claim 8, wherein said channel manager is located on the first data source.

10. The method of claim 8, wherein the channel manager is located on the second data source.

11. The method of claim 1, further comprising using the first connection to transmit an encryption key to the client computer.

12. The method of claim 11, further comprising using the encryption key to decrypt remote presentation data received at the client computer from at least the second data source.

13. A system configured to transmit remote presentation data to a client computer, comprising:
at least one processor; and
at least one memory communicatively coupled to said least one processor, the memory having stored therein computer-executable instructions for:
establishing a first connection between the first data source and the client computer, the first connection established using a lossless protocol characterized by guaranteed packet delivery and packet order;
determining that the remote presentation data comprises first data provided by the first data source and second data provided by a second data source;
negotiating connection capabilities with the client computer to determine that the client computer can support a second connection and establishing the second connection with the second data source, wherein the second connection is established using one of a lossless protocol characterized by guaranteed packet delivery and packet order or a lossy protocol characterized by non-guaranteed packet delivery and packet ordering; and using the first and second connections to manage data flow control among virtual channels formed between the client computer and at least one of the first data source and the second data source via the first and second connections, the virtual channels used by the client computer to receive the remote presentation data.

14. The system of claim 13, wherein one of the virtual channels comprises an audio channel.

15. The System of claim 13, wherein one of the virtual channels comprises a video channel.

16. The system of claim 13, further comprising:
negotiating connection capabilities with the client computer to determine that the client computer can support a third connection and establishing the third connection, wherein the third connection is established using one of a lossless protocol characterized by guaranteed packet delivery and packet order or a lossy protocol characterized by non-guaranteed packet delivery and packet ordering; and
using the first, second, and third connections to direct data flow to the client computer.

17. A computer readable storage medium storing thereon computer executable instructions for receiving remote presentation data on a client computer, said instructions for:
establishing a first connection between a first data source and the client computer, the first connection established using a lossless protocol characterized by guaranteed packet delivery and packet order;
determining that the remote presentation data comprises first data provided by the first data source and second data provided by a second data source;
negotiating connection capabilities with the client computer to determine that the client computer can support a second connection and establishing the second connection, wherein the second connection is established using one of a lossless protocol characterized by guaranteed packet delivery and packet order or a lossy protocol characterized by non-guaranteed packet delivery and packet ordering;
directing the client computer to maintain the first and second connections to manage data flow control in virtual channels formed between the client computer and at least one of the first data source and the second data source via the first and second connections, the virtual channels used by the client computer and to receive said remote presentation data including said first data using the first connection and said second data using the second connection; and
using both first and second connections to send the remote presentation data to the client computer.

18. The computer readable storage medium of claim 17, wherein said establishing the second connection comprises receiving port information for the second data source and sending the information port to the second source.

19. The computer readable storage medium of claim 18, wherein said establishing the second connection further comprises sending the port information to the client computer and instructing the client computer to establish the second connection.

20. The computer readable storage medium of claim 17, wherein said establishing the second connection further comprises receiving a first indication from the client computer of a virtual channel to be associated with said second connection and a second indication that the second connection has been established.

* * * * *